(No Model.)
A. T. WOODWARD.
INSULATING ELECTRICAL CONDUCTORS.
No. 249,284.   Patented Nov. 8, 1881.
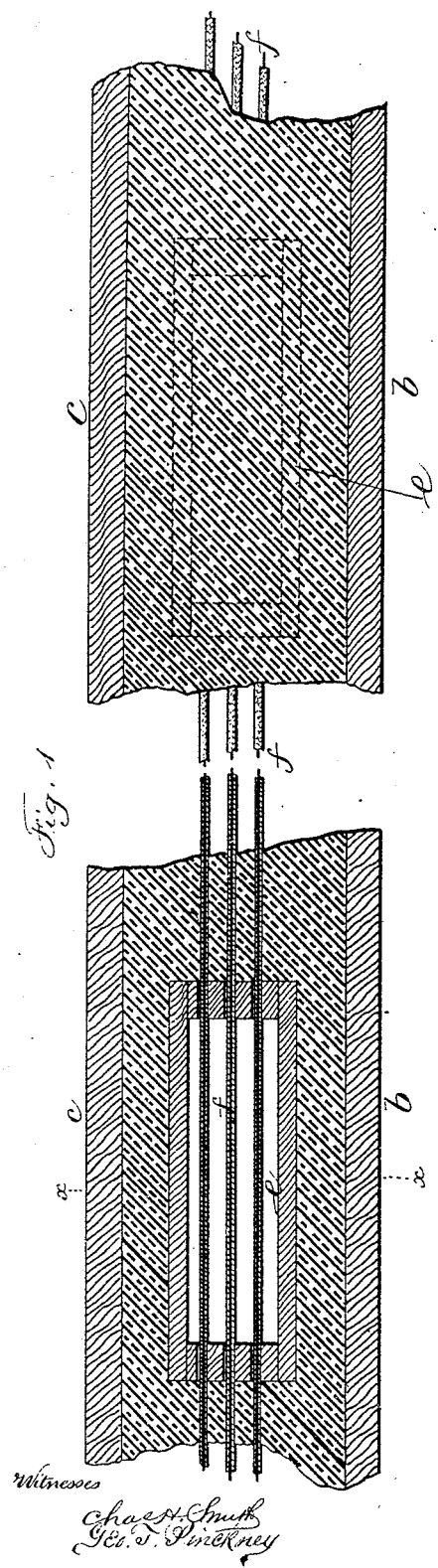
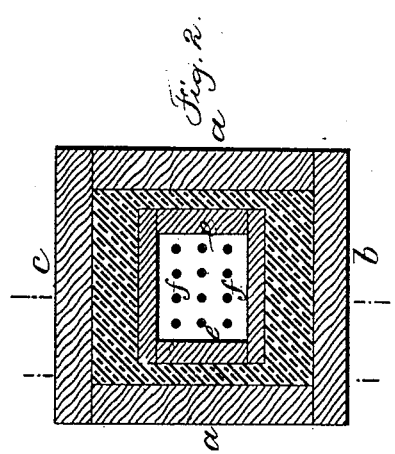
Inventor
A. T. Woodward
per
Lemuel W. Serrell
Atty

UNITED STATES PATENT OFFICE.

ARTHUR T. WOODWARD, OF NEW YORK, N. Y.

INSULATING ELECTRICAL CONDUCTORS.

SPECIFICATION forming part of Letters Patent No. 249,284, dated November 8, 1881.

Application filed August 24, 1881. (No model.)

*To all whom it may concern:*

Be it known that I, ARTHUR THADDEUS WOODWARD, of the city and State of New York, have invented an Improvement in Insulating Electric Conductors, of which the following is a correct description.

Telegraph-conductors have been laid together in parallel lines with intervening non-conducting materials, and test-boxes have been provided at intervals, and the conductors and insulating materials have been introduced into long tubes or cases.

My invention relates to the mode of rendering the whole of the conductors and the test-boxes entirely water and air proof, so that the insulation cannot be injured by moisture and access can be had to the wires, when required, for the purpose of testing the same and for taking off any lateral connections.

In the drawings, Figure 1 is a vertical section of the insulated telegraph-conductors at two of the test or connection boxes, and Fig. 2 is a cross-section at the line $x\ x$.

The case or tube into which the electric conductors are laid is to be of any desired size or shape, according to the number of conductors it is to contain; and it is preferably of wood, but may be of metal or earthenware. I have shown such box as square sectionally, with sides $a$, bottom $b$, and movable top $c$. I introduce into the bottom of the case $a\ b\ c$ a layer of water-proof insulating material, such as that referred to in my Patents Nos. 225,679 and 226,468, or any other suitable bituminous or water-proof compound may be employed. At suitable distances apart there are testing or connection boxes $e$ introduced within the case $a\ b\ c$, and the wires or conductors $f\ f$ pass through holes at the ends of these boxes. The water-proof insulating material is introduced in a melted state into the case $a\ b$ around the electric conductors, and also entirely around the testing or connection boxes $e$.

In applying the water-proof insulating material it is preferable to introduce a layer on the bottom of the case, then place thereon the lowest range of parallel conductors, then another layer of water-proof insulating material and another range of parallel wires, and so on. The water-proof insulating material flows all around the testing or connection boxes, and hermetically seals the same and renders the box perfectly water and air tight.

Where there are lateral connections they will usually be made before the cover of the box $e$ is applied; but when these lateral connections have to be made to a previously-laid cable, the cover of the external case is removed and the waterproofing material at the testing-box is removed, the insulating material broken up, and the cover of the testing-box removed to give access to the electric conductors for testing or making lateral connections, after which the box is closed and hermetically sealed by the melted insulating material.

I claim as my invention—

The combination, with the electric conductors embedded in the insulating material, of the test or connection boxes and the bituminous or other water-proof insulating material that surrounds and hermetically seals such test or connection boxes, as set forth.

Signed by me this 20th day of August, A. D. 1881.

ARTHUR T. WOODWARD.

Witnesses:
GEO. T. PINCKNEY,
CHAS. H. SMITH.